US008831853B1

(12) United States Patent
Barrowman et al.

(10) Patent No.: US 8,831,853 B1
(45) Date of Patent: Sep. 9, 2014

(54) SLIP OR LOSS OF TRACTION DETECTOR USING THE THIRD DERIVATIVE OF ROTATIONAL SPEED DIFFERENCE

(71) Applicants: Andrew Wyllie Barrowman, Coeur d'Alene, ID (US); Carl Robert Aron, Spokane, WA (US)

(72) Inventors: Andrew Wyllie Barrowman, Coeur d'Alene, ID (US); Carl Robert Aron, Spokane, WA (US)

(*) Notice: Subject to any disclaimer, the term of this patent is extended or adjusted under 35 U.S.C. 154(b) by 0 days.

(21) Appl. No.: 13/941,444

(22) Filed: Jul. 12, 2013

(51) Int. Cl.
*B60T 8/00* (2006.01)
*B60W 30/18* (2012.01)

(52) U.S. Cl.
CPC .................................. *B60W 30/18* (2013.01)
USPC ............................................. 701/82; 180/197

(58) Field of Classification Search
None
See application file for complete search history.

(56) References Cited

U.S. PATENT DOCUMENTS

| | | | |
|---|---|---|---|
| 4,484,280 A | 11/1984 | Brugger et al. | |
| 4,739,856 A | 4/1988 | Inagaki | |
| 4,763,262 A | 8/1988 | Leiber | |
| 4,896,090 A * | 1/1990 | Balch et al. | 318/52 |
| 4,946,015 A | 8/1990 | Browalski | |
| 4,953,654 A | 9/1990 | Imaseki | |
| 5,107,430 A | 4/1992 | Magnino | |
| 5,287,941 A | 2/1994 | Masuda | |
| 5,312,171 A | 5/1994 | Schafer | |
| 5,313,391 A | 5/1994 | Sigl | |
| 5,315,519 A * | 5/1994 | Chin et al. | 701/72 |
| 5,320,422 A * | 6/1994 | Tsuyama et al. | 303/141 |
| 5,469,359 A | 11/1995 | Tsuyama | |
| 5,479,811 A * | 1/1996 | Baumann et al. | 73/1.37 |
| 5,563,792 A | 10/1996 | Ander et | |
| 5,671,144 A | 9/1997 | Ryan | |
| 6,269,297 B1 | 7/2001 | Hosomi | |
| 6,701,243 B1 | 3/2004 | Roll | |
| 6,718,249 B2 | 4/2004 | Herb | |
| 6,829,529 B2 | 12/2004 | Trefzer | |
| 7,363,138 B2 * | 4/2008 | Scelers et al. | 701/82 |
| 7,444,222 B2 | 10/2008 | Villella | |
| 7,562,947 B2 | 7/2009 | Katada | |
| 7,801,657 B2 | 9/2010 | Piyabongkarn | |
| 8,214,099 B2 | 7/2012 | Scheffel | |
| 8,335,625 B2 | 12/2012 | Yamaguchi | |
| 2003/0065435 A1 * | 4/2003 | Krueger et al. | 701/82 |
| 2009/0012689 A1 * | 1/2009 | Spetler | 701/82 |
| 2010/0007200 A1 * | 1/2010 | Pelosse | 303/7 |
| 2010/0010710 A1 * | 1/2010 | Kopp et al. | 701/38 |
| 2010/0211250 A1 * | 8/2010 | Fischer et al. | 701/29 |

OTHER PUBLICATIONS

Konghui Guo, Jun Sui, A Theoretical Observation on Empirical Expression of Tire Shear Forces, Vehicle System Dynamics, Supplement 25 (1996), pp. 263-274.*

* cited by examiner

*Primary Examiner* — John R Olszewski
*Assistant Examiner* — Nicholas K Wiltey
(74) *Attorney, Agent, or Firm* — W. Patrick Quast (57) ABSTRACT

The utilization in a vehicle of the third derivative of rotational speed differences to enable early detection of the likely development or actual initiation of a condition involving wheel slip or loss of traction between the wheel and the surface over which it is traveling and to provide information to means to prevent the development of or reduce, inhibit, limit, eliminate, or control that condition is materially superior to the previously-disclosed methods intended for those purposes. The utilization of the third derivative of rotational speed differences for the indicated purposes produces highly useful and unexpected results and effectively addresses the problem of the detection of slip or loss of traction by means of a method of analysis not previously recognized or applied to that problem.

11 Claims, 6 Drawing Sheets

SLIP OR LOSS OF TRACTION DETECTOR USING THE THIRD DERIVATIVE OF ROTATIONAL SPEED DIFFERENCE

TECHNICAL FIELD OF THE INVENTION

This invention relates generally to vehicle differentials and traction control systems and to the detection of wheel slip or loss of traction between the tire of a driven wheel of a vehicle and the road surface.

BACKGROUND OF THE INVENTION

Wheel slip occurs when the torque received from a vehicle's transmission exceeds the maximum reactive force that can be sustained by the friction between one or more of the vehicle's driven wheels and the road surface.

The prior art contains numerous examples of methods proposed to detect and/or to control wheel slip. The previously-disclosed methods involve detecting and/or collecting data that are expected or presumed to reflect whether a driven wheel is slipping or has lost traction with the road surface. The references cited are representative of those methods. These methods include:

- Methods that detect what is believed to be excessive wheel speed;
- Methods that detect what is believed to be excessive wheel acceleration;
- Methods that determine vehicle speed from the speeds of the non-driven wheels;
- Methods that determine linear vehicle acceleration;
- Methods that determine lateral vehicle acceleration;
- Methods that determine yaw rate from the angle of a vehicle's steering wheel;
- Methods that determine yaw rate from accelerometers; and
- Methods that attempt to estimate coefficients of friction between road surfaces and tires.

By using one of these methods or more than one of these methods in combination, the inventions disclosed in the prior art generally operate by (i) ascertaining or modeling the path, velocity, or the trajectory of a vehicle to derive what the speeds of driven wheels are expected to be under those conditions when there is no loss of traction, (ii) comparing actual driven wheel speeds with expected driven wheel speeds, and (iii) deeming a driven wheel that exceeds in some specified degree its expected speed to be slipping or to have lost traction.

The methods of these inventions are essentially compromised because of the considerable range of differences between a vehicle's wheel speeds that are consistent with there being no slip or loss of traction whatever may be the path, velocity, or trajectory of the vehicle. In other words, the modeling is inherently imprecise, and the models' expected wheel speeds can only be approximations of actual wheel speeds. A vehicle's actual wheel speeds are influenced by many external factors which are unrelated to slip or loss of traction and which vary continuously. These external factors include, by way of examples, the path traveled, vehicle load, load distribution, surface gradient, surface camber, tire wear, tire dimensions, tire temperature, tire inflation, tire pressure, ambient temperature, type of road surface, road surface temperature, relative humidity, precipitation, surface contamination, etc.

As a result of the variability in wheel speeds deriving from those sources when the driven wheels are not slipping, estimates derived from modeling of what wheel speeds ought to be are not and cannot be very accurate, and the effect of their application to purport to detect slip or loss of traction is necessarily to create an illusion of certainty when the data employed to detect slip or loss of traction are inherently ambiguous. The problem of data ambiguity is not cured by looking at wheel speed differences, the acceleration of wheel speeds, or the acceleration of wheel speed differences because there are no thresholds that can be calculated that discriminate clearly between:

- Wheel speeds, wheel speed differences, accelerations of wheel speeds, or accelerations of wheel speed differences that reflect the paths followed by the wheels or the differences in the paths followed by the wheels as a result of the turning of the vehicle and/or changes in the speed or acceleration of the vehicle: and
- Wheel speeds, wheel speed differences, accelerations of wheel speeds, or accelerations of wheel speed differences that are indicative of wheel slip.

In consequence:

- There has to be a significant amount of uncertainty in relation to deeming a driven wheel that exceeds in some specified degree its expected speed to be slipping or to have lost traction based upon such modeling;
- The uncertainty requires the methods of the prior art necessarily to declare the presence or absence of slip when such presence or absence is unavoidably ambiguous as a result of the nature of the modeling methods applied and the data utilized; and
- The numerous traction control and differential control methods of the prior art are either always or most often too quick and excessively aggressive in reacting to wheel slip or too tardy and insufficiently aggressive in reacting to wheel slip.

Stated differently, because the methods of the prior art cannot resolve the ambiguity inherent in their models and their data with precision, those methods must either, in the first case, err by waiting until the ambiguity resolves itself, and the wheel is clearly slipping, or, the second case, err by not waiting until the ambiguity resolves itself and prematurely declaring slip before it actually arises.

- In the first case, the methods are not much good at detecting incipient slip;
- In the second case, the methods presumably invoke anti-slip means when slip is not actually present;
- In the first case, delay results in increasing slip as unreduced torque is applied to the slipping wheel, and the spinning up of the wheel makes getting the wheel back under control more difficult because the late or inadequately aggressive slip-prevention efforts will allow a vehicle to decelerate while an increasing amount of kinetic energy is added to the slipping wheel, and, while this combination of factors persists, the vehicle loses momentum; moreover, the loss of momentum tends to exacerbate the loss of traction, and the vehicle's operator is likely to react to this situation by increasing the power output of the vehicle's engine although doing so only increases the kinetic energy stored in the slipping wheel, which energy has to be dissipated to slow the wheel before that wheel can provide any significant tractive force; and
- In the second case, the over-aggressive prevention of wheel speed difference imposes a continuous load on a vehicle's power-train that reduces the life of power-train components and increases fuel consumption; and in certain cases, over-aggressive prevention of wheel speed differences that should be permitted can also reduce vehicle stability.

The inventors contend that:

Incipient slip can only be detected by utilizing higher derivatives of wheel speed differences;

Calculations of those higher derivatives must be based upon information received from the wheels themselves; and Attempting to model expected wheel speeds, expected wheel speed differences, expected accelerations of wheel speeds, or expected accelerations of wheel speed differences is flawed.

The foundation for these contentions is the fact that the only place where the friction between the road and a tire can be properly determined is where the tire is on the road and then only at that particular instant in time. In other words, the best information comes from the tire/wheel itself. The modeling methods of the prior art separate the detection of slip from the direct use of the information that comes from the wheel/tire itself, and this separation is the source of the estimation and ambiguity inherent in the modeling methods.

In the inventors' view, the essential problem, which is not solved by the prior art, is to devise a method of determining what the relationship between the wheel speeds ought to be under normal driving conditions even though those conditions have significant variability. The third derivative of actually measured wheel speed difference does precisely that and eliminates entirely or substantially entirely the ambiguity inherent in the methods disclosed in the prior art. The use of the third derivative of actually measured wheel speed difference avoids the separation of the detection of slip from the direct use of the information that comes from the tires/wheels themselves.

An examination of the behavior of the third derivative of wheel speed differences reveals that its value is or is near zero under all conditions except those conditions that involve slip or loss of traction.

The value of the use of the third derivative of wheel speed difference to detect slip or loss of traction derives from the facts that:

The third derivative of wheel speed difference provides a unitary threshold (value=0) for the detection of slip or loss of traction; and The fact that the value of the third derivative of wheel speed difference varies from zero very materially when slip is present and varies from zero quite immaterially in the absence of slip.

The inventors do understand that they are making the assumptions, in connection with the use of the third derivative of wheel speed difference to detect slip, that (i) all of the variables that do not reflect slip affect the tires fairly equally, and (ii) the only likely cause of a sudden change in wheel speed difference is the change in the coefficient of friction at a tire. The inventors believe that these assumptions are reasonable and well grounded.

The causes and consequences of the limitations of the teachings of the prior art include the following:

The prior art does not rely upon the data necessary to discriminate properly between characteristics of the wheels' rotation that indicate wheel slip and characteristics of the wheels' rotation that do not indicate wheel slip;

The prior art is not grounded in an understanding that a vehicle, and the vehicle's operator, have significant inertias that automatically determine the rates of change of wheel speed differences during normal vehicle travel, and that these inertias impose significant limits on the angular accelerations that a vehicle and its operator are subjected to during normal vehicle travel;

The prior art is not grounded in an understanding that the magnitudes of the higher derivatives of wheel speed difference during normal vehicle travel are significantly constrained by the limitations on the angular accelerations that are imposed on a vehicle and its operator by virtue of their inertias, and that magnitudes of the higher derivatives of wheel speed differences that lie beyond theses magnitudes are indications of slip; and The prior art makes no reference to the use of the second or third derivative of wheel speed difference to detect slip or loss of traction and, in fact, teaches away from those approaches by complicating the analysis with diverse factors and modeling efforts.

The use of second derivative of wheel speed differences to detect slip or loss of traction is not without value, but is not as useful as the third derivative because the value of the third derivative is zero in more cases than is the second derivative, and the second derivative has a constant non-zero value in certain cases.

The use of the third derivative of wheel speed differences to detect slip or loss of traction is wholly unanticipated by the prior art, is more effective for that purpose than the methods of the prior art, and is vastly simpler than the prior art for that purpose.

This application does not build upon the prior art. The teaching of this application is wholly distinguishable from the teaching of the prior art.

SUMMARY OF THE INVENTION

A method involving the use of the third derivative of speed differences between wheels on a vehicle is proposed to detect a slip condition.

The following observations, more fully discussed later in this patent disclosure, form a part of the useful and novel basis for the invention herein disclosed:

a. When the vehicle is traveling on a path that either has a constant radius, or has a radius changing at a rate that maintains a constant rate of change of centripetal acceleration, and the vehicle has zero acceleration, constant acceleration, or has an acceleration that varies at a constant rate, in the absence of slip or loss of traction, the value of the third derivative of the speed difference between any two wheels is zero;

b. When the vehicle is traveling on a path that neither has a constant radius, nor a radius changing at a rate that would maintain a constant rate of change of centripetal acceleration, or the vehicle has acceleration that changes at a variable rate, in the absence of slip or loss of traction, the value of the third derivative of the speed difference between any two wheels deviates from zero, but the deviation is much smaller in the absence of slip or loss of traction than in the presence of slip or loss of traction;

c. When a vehicle experiences slip or loss of traction, the change in the value of the third derivative of the speed difference between any two wheels is large in relation to changes in the value of third derivative of the speed difference between any two wheels due to causes other than slip or loss of traction whatever may be the path or acceleration of the vehicle, and, therefore, the use of the third derivative of the speed difference between any two wheels is an effective means to distinguish between wheel speed differences that reflect slip or loss of traction and wheel speed differences that do not reflect slip or loss of traction; and d. The third derivative of the speed difference between any two wheels promptly exhibits a peaking value when there is an onset of slip or loss of traction, and, therefore, the use of the third derivative of wheel speed difference is a timely means to distinguish between wheel speed differences that reflect slip or loss of traction and wheel speed differences that do not reflect slip or loss of traction.

The invention detects non-zero values in the third derivative of wheel speed difference to make a rapid determination of the existence of a wheel-slip state, and those values and/or the existence or non-existence of a wheel-slip state can be communicated to a vehicle's traction control system or controllable differential or other slip prevention means. Those slip prevention means would utilize the information made available by this invention identifying a slip condition together with data collected, or information developed from that data, by those slip prevention means to determine how to address that identified slip condition The scope of applicability of the preferred embodiments will become apparent from the following detailed description, claims, and drawings. It should be understood that the description and specific examples, although indicating preferred embodiments of the invention, are given by way of illustration only. Various changes and modifications to those described embodiments and examples will become apparent to those skilled in the art. The utilization of analog voltages in the description of the preferred embodiments is intended to import clarity and not to limit the invention or to preclude or discourage the use of digital processing or other computational means. The utilization of digital processing in the description of the invention would, in the inventors' view, add undue complexity to the communication of the core teaching of the invention. The utilization of digital processing in the implementation of the invention would not pose any problems for persons skilled in the art who understood the core teaching of the invention.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
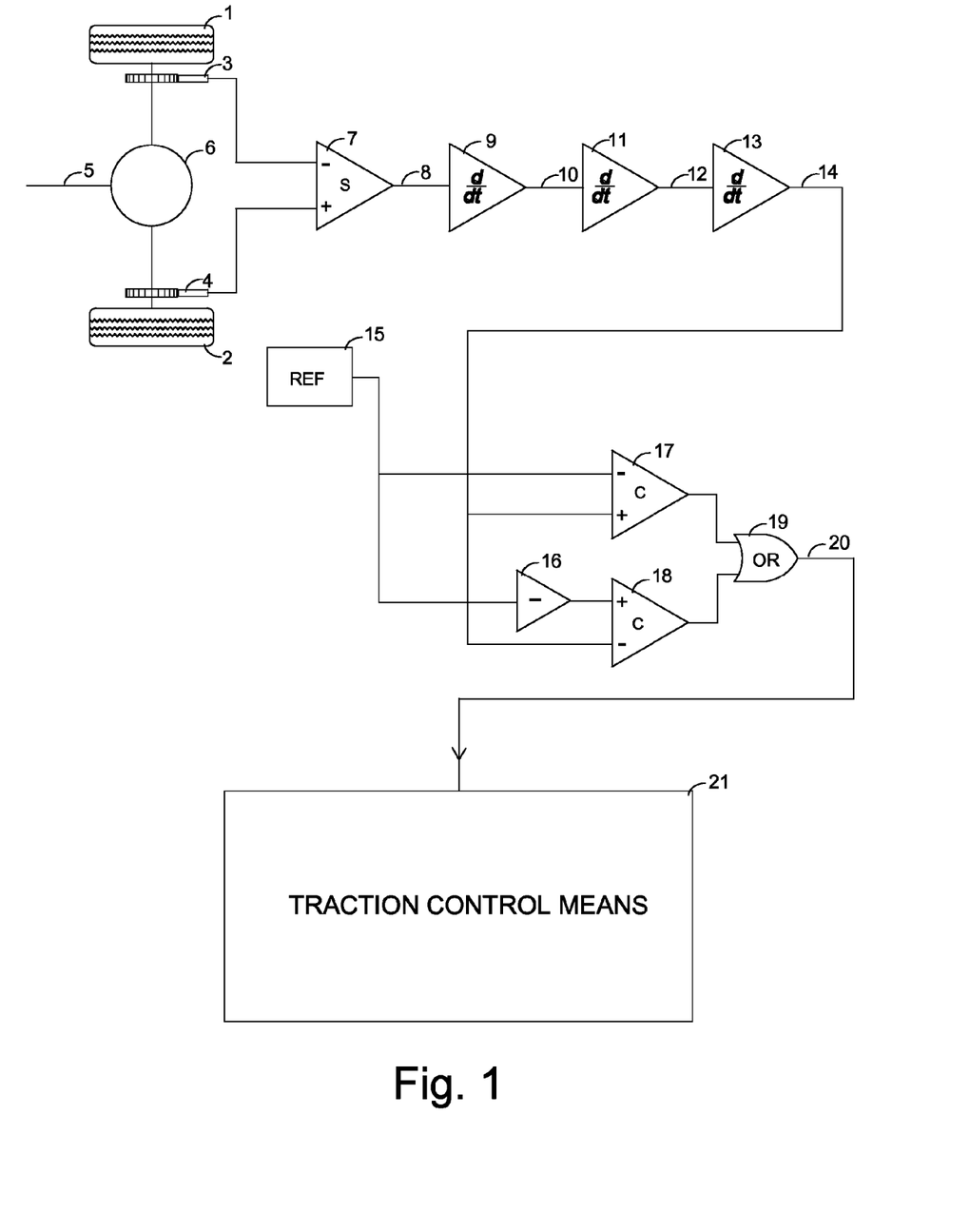
FIG. 1 is a schematic of a method to detect wheel slip.

FIG. 1 illustrates details of a slip detection method applied to a driven axle of a vehicle. Drive torque is received by shaft 5 and communicated to wheels 1 and 2 by differential 6. Speed transducers 3 and 4 produce analog voltages proportional to the speeds of wheels 1 and 2. Summing amplifier 7 produces a voltage at 8 proportional to the difference between the speeds of wheels 1 and 2 and applies that voltage to first differentiator 9 which produces a voltage at 10 that represents the first derivative of the difference between the speeds of wheels 1 and 2.

Output of differentiator 9 at 10 is applied to second differentiator 11 which produces a voltage at 12 that represents the second derivative of the difference between the speeds of wheels 1 and 2.

Output of differentiator 11 at 12 is applied to third differentiator 13 which produces a voltage at 14 that represents the third derivative of the difference between the speeds of wheels 1 and 2.

Comparator 17 compares voltage at 14 from third differentiator 13 with voltage from reference source 15. When voltage from third differentiator 13 is more positive than voltage from reference source 15, logic output from comparator 17 is asserted.

The voltage supplied by reference source 15 is a preset positive voltage that prevents non-zero magnitudes of the third derivative voltage at 14 that are less than the magnitude of the reference source from communicating a slip condition to the vehicle's traction control means 21. This prevents small amplitude values in the third derivative caused by noise, vibration and erratic driving from indicating a slip condition. The value of reference 15 is determined empirically for a particular vehicle, and it may be altered dynamically in response to the mode of operation of the vehicle.

Analog inverter 16 inverts positive reference voltage from reference source 15 to produce a negative voltage reference of the same magnitude as the positive voltage from reference source 15. Comparator 18 compares voltage from third differentiator 13 with negative voltage from inverter 16. When voltage from third differentiator 13 is more negative than voltage from inverter 16, logic output from comparator 18 is asserted.

Output from OR gate 19 at 20 is asserted when either of the outputs from comparators 17 and 18 are asserted. The output from OR gate 19 communicates the onset of wheel-slip to vehicle's traction control means 21 when logic level at 20 becomes asserted.

Figure 2:
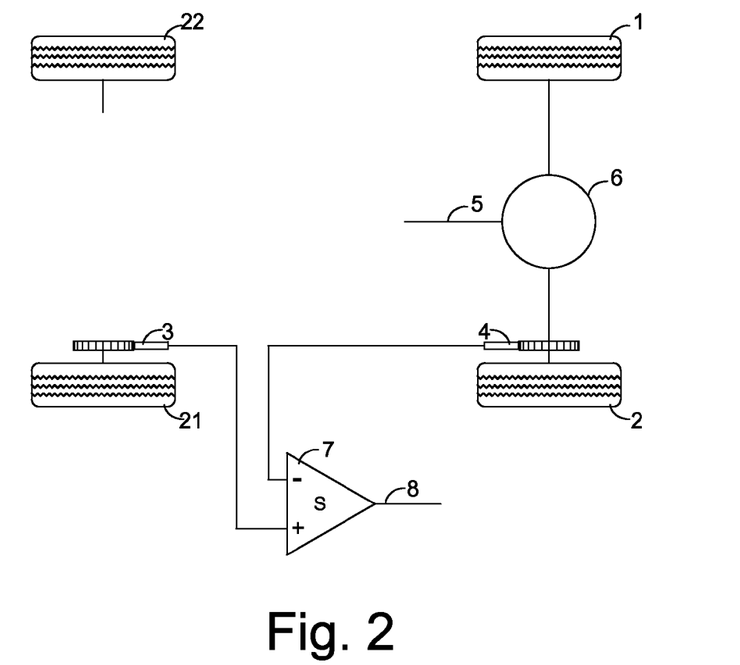
FIG. 2 is schematic of a method to detect wheel slip from the speed difference between a driven and a non-driven wheel.

FIG. 2 illustrates details of a slip detection method applied a vehicle with driven wheels 1 and 2 and non-driven wheels 21 and 22 when the speed difference is evaluated between one driven wheel 2 and non-driven wheel 21

Figure 3:
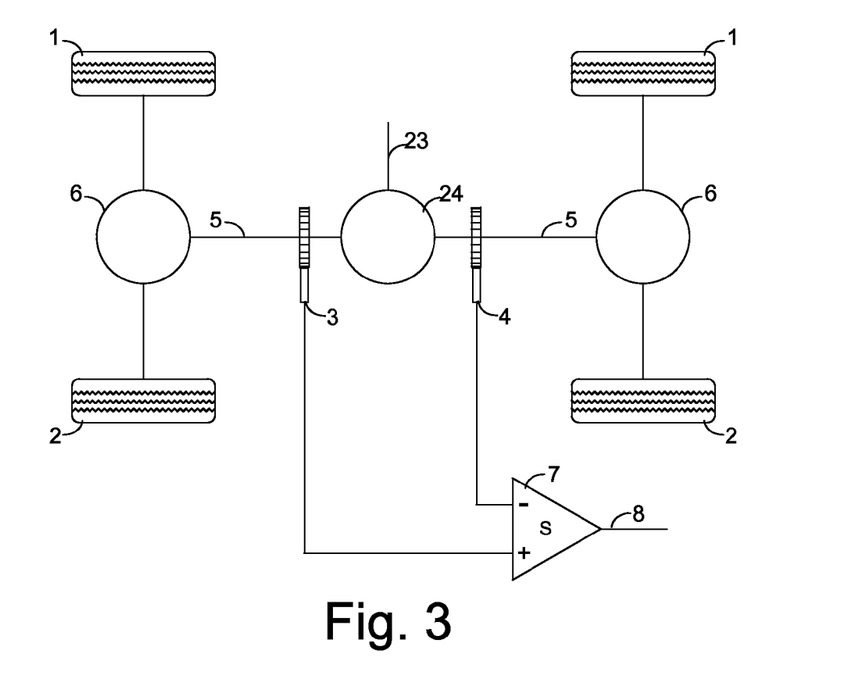
FIG. 3 is a schematic of a method to detect wheel slip on a vehicle with four driven wheels.

FIG. 3 illustrates details of a slip detection method applied to vehicle with four driven wheels when speed difference is evaluated between drive-shafts driven from a central differential. Drive torque is received by shaft 23 and communicated to shafts 5 by central differential 24.

Figure 4:
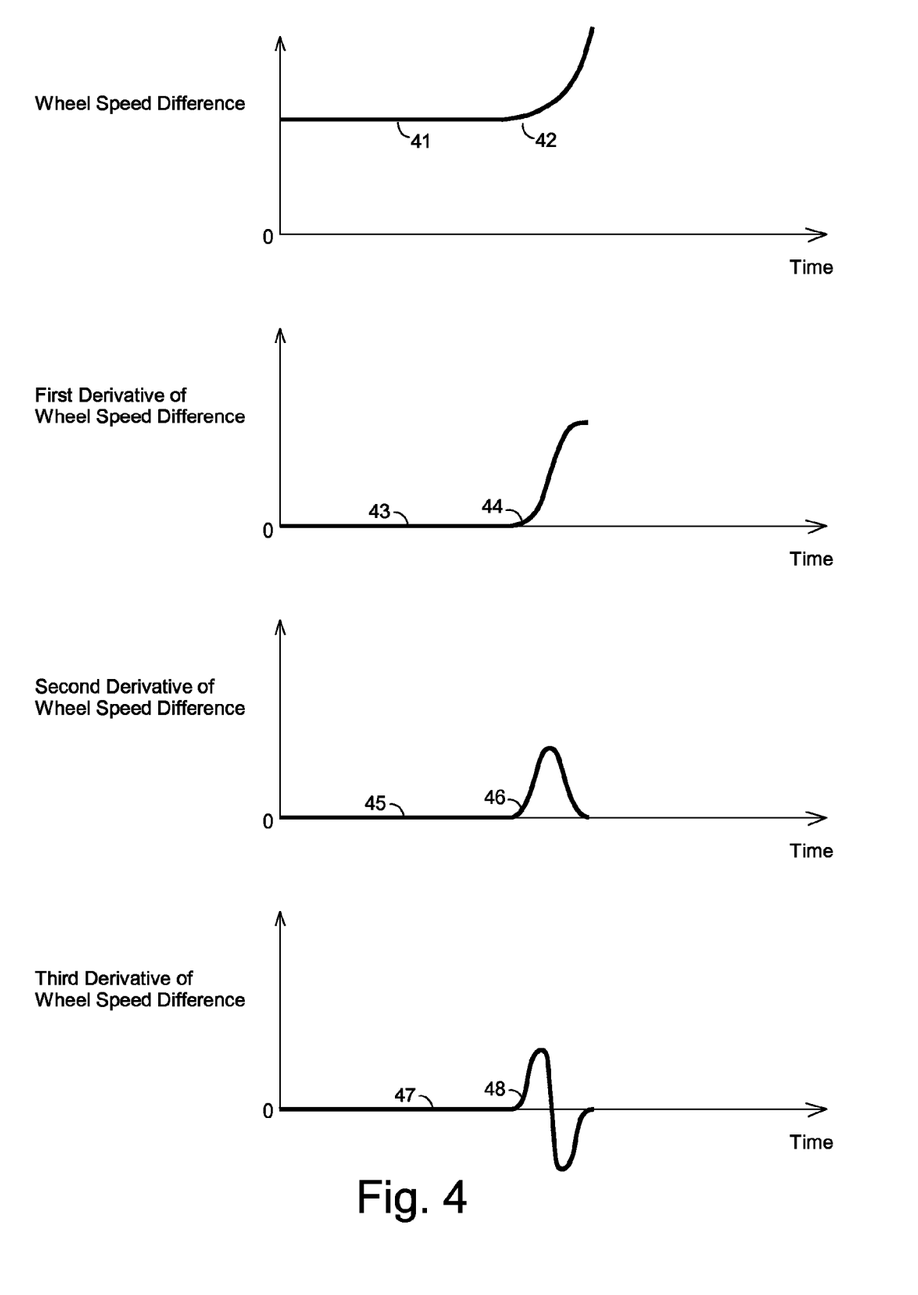
FIG. 4 graphs wheel speed difference and the first, second, and third derivatives of wheel speed difference against time for a vehicle traveling on a constant radius curve at constant speed.

FIG. 4, FIG. 5, FIG. 6, and FIG. 7 are graphs of representative analog voltages of the circuitry in FIG. 1 during a vehicle's different driving conditions. FIG. 4 is representative of a vehicle traveling at constant speed on a curve with fixed radius. Under normal driving conditions, the wheel speed difference is constant as indicated by horizontal line 41 and found at 8. In the event of wheel slip there is a rapid increase in the difference as indicated at 42. While the difference remains constant, first, second and third derivatives found at 10, 12 and 14 respectively remain at zero as indicated at 43, 45 and 47 respectively, but in the event of slip, first, second and third derivatives produce non-zero waveforms as indicated at 44, 46 and 48 respectively.

Figure 5:
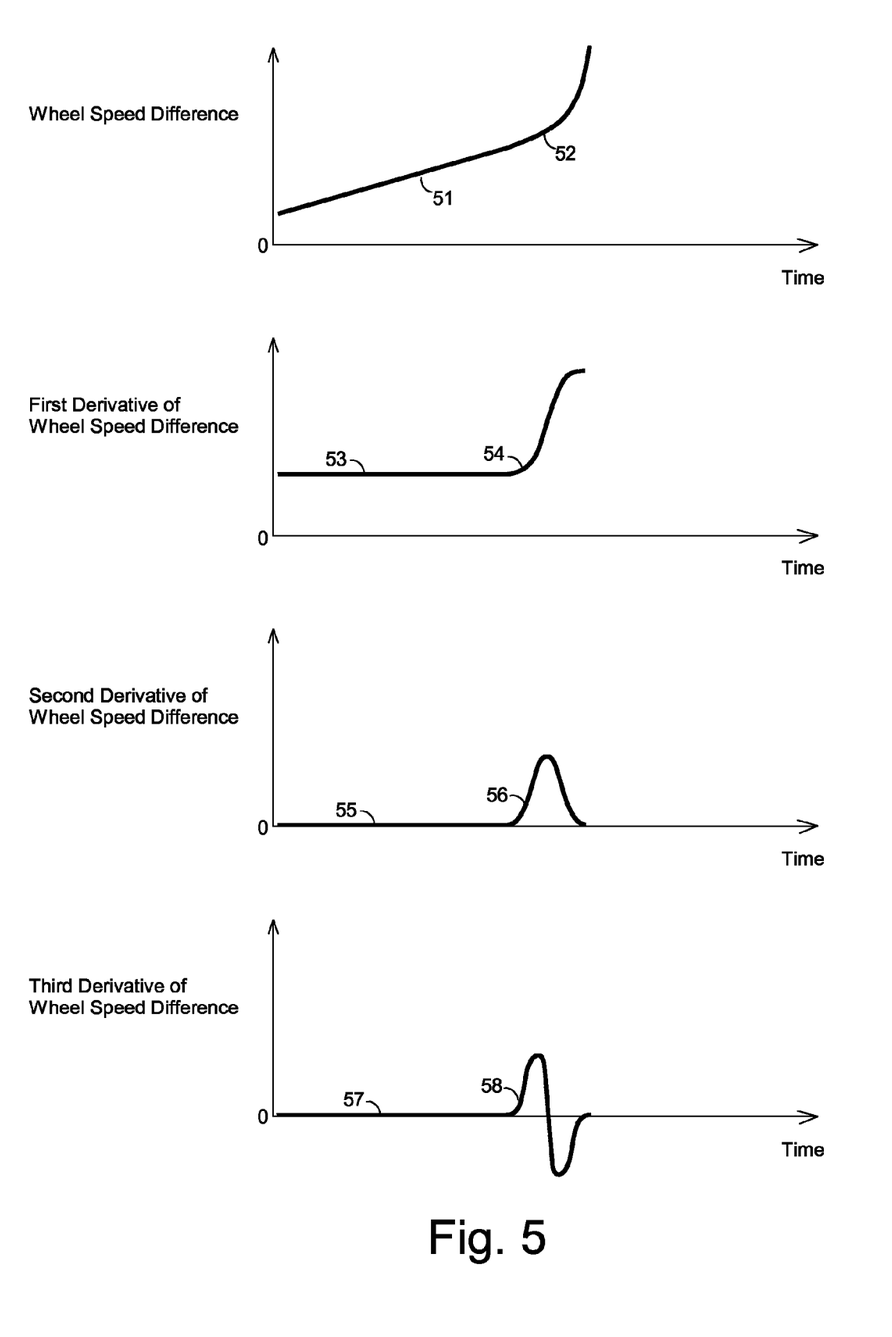
FIG. 5 graphs wheel speed difference and the first, second, and third derivatives of wheel speed difference against time for a vehicle traveling on a transition curve at constant speed, on a constant radius curve with constant acceleration, or on a transition curve with constant acceleration.

FIG. 5 represents the conditions that occur when the vehicle is traveling at constant speed on a transition curve, or has constant acceleration on a constant radius, or transition, curve. Under normal driving conditions there is a constant rate of change in wheel speed difference as indicated by straight line ramp 51 and found at 8. In the event of wheel slip there is a rapid increase in the difference as indicated at 52. While the rate of change of difference remains constant, first derivative found at 10 is non-zero but constant as indicated by horizontal line 53. Second and third derivatives found at 12 and 14 respectively remain at zero as indicated at 55 and 57. In the event of slip, first, second and third derivatives produce waveforms as indicated at 54, 56 and 58 respectively.

Figure 6:
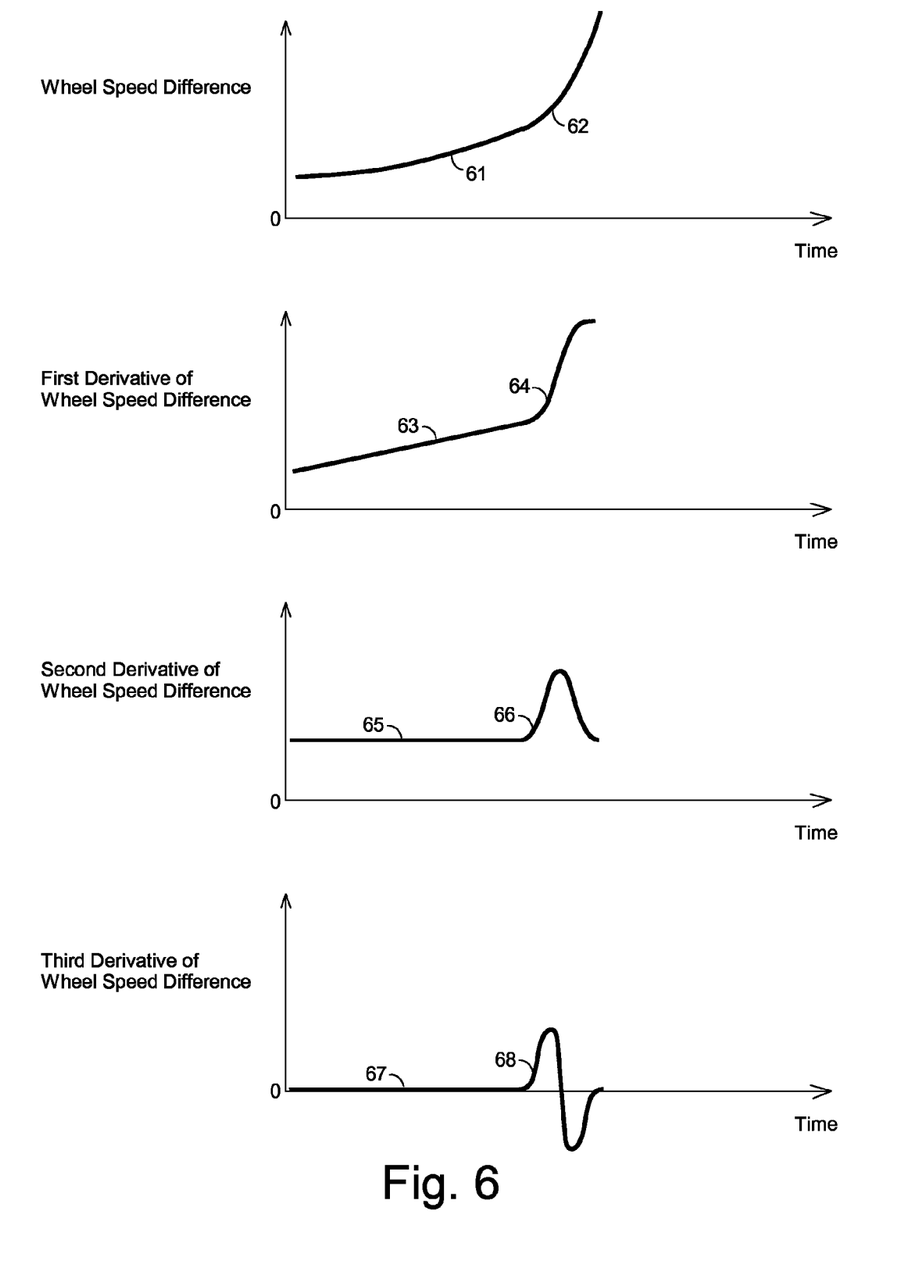
FIG. 6 graphs wheel speed difference and the first, second, and third derivatives of wheel speed difference against time for a vehicle traveling on a constant radius curve or transition curve with a constant rate of change of acceleration.

FIG. 6 represents the conditions that occur when the vehicle is traveling with acceleration changing at a constant rate either on a curve of constant radius or on a transition curve. Under normal driving conditions the rate of change in wheel speed difference is increasing at a constant rate as indicated by parabolic curve 61 and found at 8. In the event of wheel slip there is a rapid increase in the difference as indicated at 62. While the rate of change of the rate of change in the difference remains constant, first derivative found at 10 is constantly changing as indicated by straight line ramp 63. Second derivative found at 12 is non-zero but constant as indicated by horizontal line 65, and third derivative found at 14 remains at zero as indicated at 67. In the event of slip, first, second and third derivatives produce waveforms as indicated at 64, 66 and 68 respectively.

Figure 7:
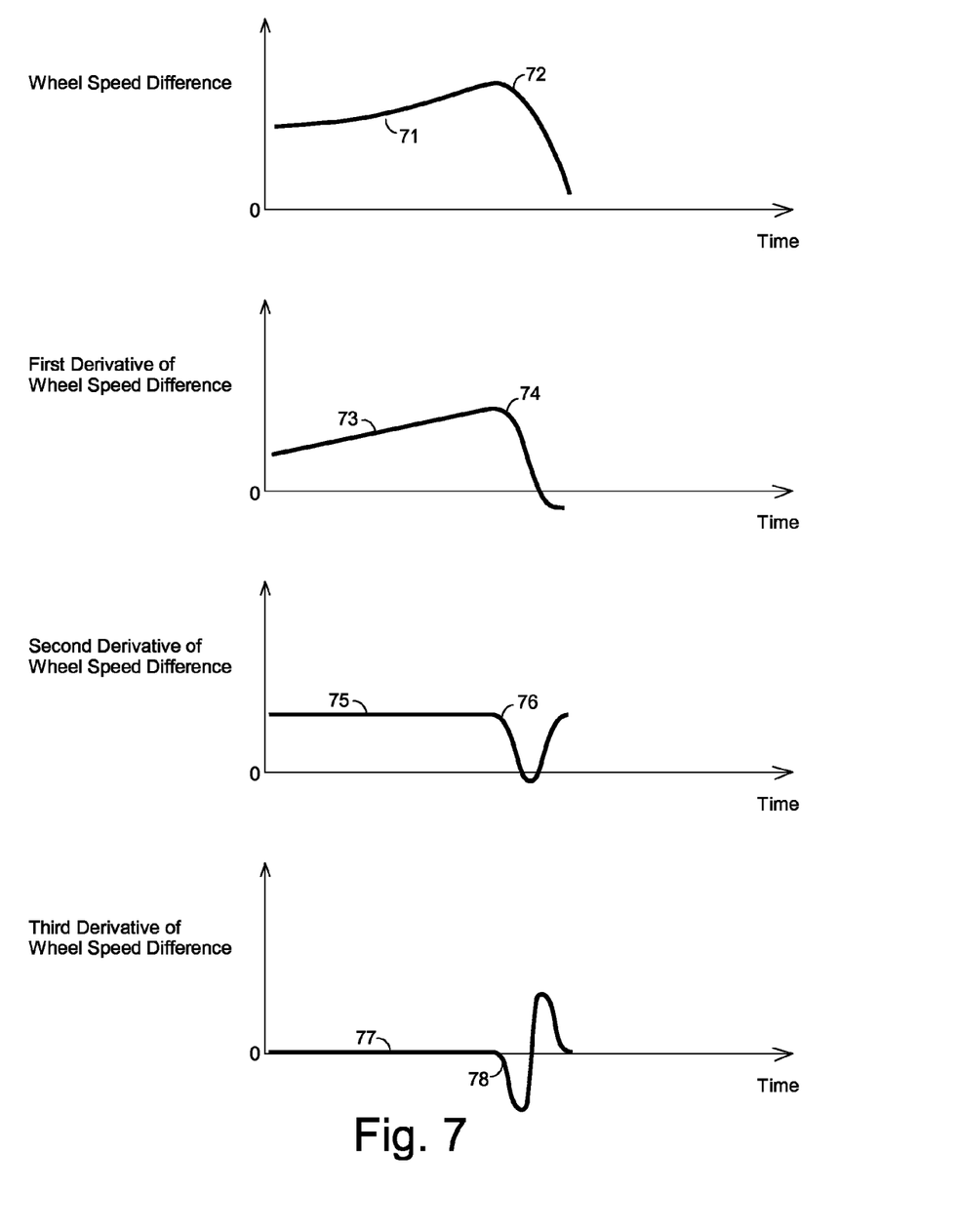
FIG. 7 graphs wheel speed difference and the first, second, and third derivatives of wheel speed difference against time for a vehicle traveling on a constant radius curve, or transition curve, with a constant rate of change of acceleration when wheel slip results in a reduction in speed difference.

Similarly, FIG. 7 represents the conditions that occur when the vehicle is traveling with acceleration that is changing at a constant rate, either on a curve of constant radius, or on a transition curve except that the wheel that slips produces a reduction in the speed difference rather than an increase in speed difference as shown in the prior examples. Under normal driving conditions the rate of change in wheel speed difference is increasing at a constant rate as indicated by parabolic curve 71 and found at 8. In the event of wheel slip there is a rapid decrease in the difference as indicated at 72. While the rate of change of the rate of change in the difference remains constant, first derivative found at 10 is constantly changing as indicated by straight line ramp 73. Second derivative found at 12 is non-zero but constant as indicated by horizontal line 75, and third derivative found at 14 remains at zero as indicated at 77. In the event of slip, first, second and third derivatives produce negative-going waveforms as indicated at 74, 76 and 78 respectively.

While certain functional elements of the embodiments in FIG. 1, FIG. 2, and FIG. 3 are analog devices, those skilled in the art will appreciate that the analog functional elements may be implemented in whole or in part by either analog or digital methods, or a combination of both.

As used in the claims that follow, the term "the Third Derivative of Wheel Speed Difference" means and refers to both and either of (a) the third derivative with respect to time of the difference in speed between two wheels and (b) the difference between the third derivatives with respect to time of the speed of two wheels.

As used herein, the term "the Third Derivative of Axle Speed Difference" means and refers to both and either of (a) the third derivative with respect to time of the difference in speed between two axles and (b) the difference between the third derivatives with respect to time of the speed of two axles.

It should be noted that (a) and (b) are in both cases equivalents and are merely different means of expressing or approaching the desired calculation, and this observation is a reflection of what is referred to in calculus as "the sum rule in differentiation."

No claims based upon the Third Derivative of Axle Speed Difference are asserted separately because it is obvious that the axles must rotate at the same speeds as the wheels attached thereto, and, therefore, claims based upon the Third Derivative of Wheel Speed Difference comprehend claims based upon the Third Derivative of Axle Speed Difference.

As used in the claims that follow, the term "pair of wheels" means and refers to any two wheels of the vehicle wherever located whether front and rear on one side, front and rear on opposite sides, opposing front wheels, or opposing rear wheels.

What is claimed is:

1. A system that utilizes a third derivative with respect to time of a wheel speed difference to determine whether a first wheel of a pair of wheels of a wheeled road vehicle is slipping relative to a second wheel of the pair of wheels, wherein the first wheel is a driven wheel, and where the wheeled road vehicle includes a means to reduce, limit, or prevent the development of loss of traction between a driven wheel and a surface over which a driven wheel is traveling, comprising:
   (a) a first means to determine a wheel speed of each wheel of the pair of wheels and to produce a respective electrical signal proportional to the wheel speed of each wheel in the pair of wheels;
   (b) a second means adapted to receive each respective signal and to produce a second electrical output signal proportional to the wheel speed difference between the wheel speed of each wheel of the pair of wheels;
   (c) a third means adapted to receive and process said second electrical output signal so as to produce a third electrical output signal proportional to the third derivative with respect to time of said second electrical output signal, said third electrical signal having a value of zero when there is no slipping between the first wheel and the second wheel; and,
   (d) a fourth means functionally adapted to receive said third electrical output signal, said fourth means further adapted to process said third electrical output signal such that, if the deviation from zero of said third electrical output signal exceeds a predetermined threshold value, the means to reduce, limit, or prevent the development of loss of traction between a driven wheel and the surface over which a driven wheel is traveling becomes cooperatively engaged.

2. The system claimed in claim 1 where the said means to reduce, limit, or prevent the development of loss of traction between a driven wheel and the surface over which a driven wheel is traveling is selected from a group consisting of at least one of a traction control system, a braking system, an engine control system, a torque transmission device, and an electronic differential.

3. The system claimed in claim 1 where the second wheel is also a driven wheel.

4. The system claimed in claim 1 where the first wheel is part of a first pair of wheels of the wheeled road vehicle and the second wheel is part of a second pair of wheels.

5. The system claimed in claim 4 where the second wheel is also a driven wheel.

6. The system claimed in claim 4 where all four wheels are driven wheels.

7. A method of activating means to reduce, limit, or prevent the development of loss of traction between a driven wheel and a surface over which a driven wheel is traveling, comprising the steps of:
  (a) calculating a wheel speed of each wheel of a pair of wheels, including a driven wheel, by employing a pair of respective wheel speed transducers, so as to produce a respective electrical signal proportional to the wheel speed of each wheel in the pair of wheels;
  (b) processing each respective signal so as to produce a second electrical output signal proportional to a wheel speed difference between the wheel speed of each wheel of the pair of wheels;
  (c) processing said second electrical output signal so as to produce a third electrical output signal proportional to a third derivative with respect to time of said second electrical output signal, said third electrical signal having a value of zero when there is no slipping between the wheels forming the pair of wheels;
  (d) processing said third electrical output signal such that, if the deviation from zero of said third electrical output signal exceeds a predetermined threshold value, the means to reduce, limit, or prevent the development of loss of traction between a driven wheel and the surface over which a driven wheel is traveling becomes cooperatively engaged.

8. The method claimed in claim 7 where the second wheel is also a driven wheel.

9. The method claimed in claim 7 where the first wheel is part of a first pair of wheels of the wheeled road vehicle and the second wheel is part of a second pair of wheels.

10. The method claimed in claim 9 where the second wheel is also a driven wheel.

11. The method claimed in claim 9 where all four wheels are driven wheels.

* * * * *